US011354796B2

(12) United States Patent
Tricarico et al.

(10) Patent No.: US 11,354,796 B2
(45) Date of Patent: Jun. 7, 2022

(54) IMAGE IDENTIFICATION AND RETRIEVAL FOR COMPONENT FAULT ANALYSIS

(71) Applicant: GM GLOBAL TECHNOLOGY OPERATIONS LLC, Detroit, MI (US)

(72) Inventors: Davide Tricarico, Turin (IT);
Alessandra Neri, Piemonte (IT);
Giovanni Tomasino, Vercelli (IT);
Dario Pietro Cavallo, Brindisi (IT);
Daniele Gionta, Piemonte (IT)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 16/774,752

(22) Filed: Jan. 28, 2020

(65) Prior Publication Data
US 2021/0233221 A1    Jul. 29, 2021

(51) Int. Cl.
*G06K 9/62* (2022.01)
*G06T 7/00* (2017.01)
(Continued)

(52) U.S. Cl.
CPC ............ *G06T 7/001* (2013.01); *G06F 16/51* (2019.01); *G06F 16/538* (2019.01); *G06N 3/08* (2013.01);
(Continued)

(58) Field of Classification Search
CPC ........... G06T 7/001; G06T 2207/20081; G06T 2207/20084; G06F 16/51; G06F 16/538; G06F 16/583; G06F 16/532; G06N 3/08
See application file for complete search history.

(56) References Cited

U.S. PATENT DOCUMENTS

2005/0286753 A1    12/2005  Ho
2007/0233438 A1*   10/2007  Quimper ............ G05B 23/0278
                                               703/6
(Continued)

FOREIGN PATENT DOCUMENTS

DE    102014214851 A1    2/2016
DE    102018127518 A1    5/2020

OTHER PUBLICATIONS

Hua He et al., "Pairwise Word Interaction Modeling with Deep Neural Networks for Semantic Similarity Measurement", Proceedings of NAACL-HLT 2016, pp. 937-948, San Diego, California, Jun. 12-17, 2016.*

(Continued)

*Primary Examiner* — Samir A Ahmed
(74) *Attorney, Agent, or Firm* — Quinn IP Law

(57) ABSTRACT

A method of identifying and retrieving component digital images for component fault analysis includes generating a known-fault database of digital images of known faults of a previously analyzed component and corresponding remedial actions. The method also includes accessing the known-fault database with a digital image of a current fault of a new component. The method additionally includes comparing the digital image of the current fault with the digital images in the known-fault database based on a computed target characteristic. The method also includes sorting the digital images in the known-fault database in order based on a magnitude of the computed target characteristic for each respective digital image in the known-fault database relative to the digital image of the current fault. The method further (Continued)

includes outputting the sorted digital images to facilitate correlation of the current fault to a particular known fault and identifying the corresponding remedial action.

16 Claims, 6 Drawing Sheets

(51) Int. Cl.
  *G06F 16/51*   (2019.01)
  *G06N 3/08*   (2006.01)
  *G06F 16/538*  (2019.01)
(52) U.S. Cl.
  CPC .............. *G06T 2207/20081* (2013.01); *G06T 2207/20084* (2013.01)

(56) References Cited

U.S. PATENT DOCUMENTS

| | | | |
|---|---|---|---|
| 2008/0177438 A1* | 7/2008 | Chen | G07C 5/008 701/31.4 |
| 2013/0114878 A1* | 5/2013 | Scheid | G06T 7/001 382/141 |
| 2015/0261776 A1* | 9/2015 | Attarde | G06F 16/1748 707/664 |
| 2016/0069778 A1* | 3/2016 | Sahu | G06Q 50/08 702/183 |
| 2016/0292518 A1* | 10/2016 | Banitt | G06K 9/66 |
| 2016/0314571 A1* | 10/2016 | Finn | G06F 16/40 |
| 2018/0172601 A1* | 6/2018 | Wild | G06T 7/0004 |
| 2018/0173212 A1* | 6/2018 | Poh | G05B 23/0235 |
| 2020/0278901 A1* | 9/2020 | Singh | G06F 11/004 |

OTHER PUBLICATIONS

Weiyang Liu et al., "Large-Margin Softmax Loss for Convolutional Neural Networks", Proceedings of the 33rd International Conference on Machine Learning, New York, NY, USA, 2016. JMLR: W&CP vol. 48.*

Dengsheng Zhang et al., "Evaluation of Similarity Measurement for Image Retrieval", 2003 IEEE.*

Je-Kang Park etal., "Machine Learning-Based Imaging System for Surface Defect Inspection", International Journal of Precision Engineering and Manufacturing—Green Technology vol. 3, No. 3, pp. 303-310.*

Augustas Urbonas, Vidas Raudonis, Rytis Maskeliunas and Robertas Damasevicius, "Automated Identification of Wood Veneer Surface Defects Using Faster Region-Based Convlutional Neural Network With Data Augmentation and Transfer Learning", Appl. Sci. 2019, 9, 4898; doc:10.3390/app/9224898, www.mdpi.com/journal/applsci; 20 pages, Published Nov. 15, 2019.

Tobias Schlagenhaur, Frauk Yildirim, Benedikt Bruckner, and Jurgen Fleischer, "Siamese Basis Function Networks for Defect Classification", In: arXiv prepring arXiv:2012.01338, 2020 (Publicatin Date Sep. 12, 2020). (URL: https://arxiv.org/pdf/2012.01338), 9 pages.

Aijun Yin, Yinghua Yan, Zhiyu Zhang, Chuan Li and Rene-Vinicio Sanchez, "Fault Diagnosis of Wind Turbine Gearbox Based On the Optimized LSTM Neural Network With Cosine Loss", Sensors 2020, 20,2339, doi:10.3390/s20082339; www.mdpi.com/journal/sensors; 13 pages, Published Apr. 20, 2020.

* cited by examiner

IMAGE IDENTIFICATION AND RETRIEVAL FOR COMPONENT FAULT ANALYSIS

INTRODUCTION

The present disclosure relates to identification and retrieval of component digital images for component fault analysis. The subject images may specifically represent vehicle components exhibiting particular flaws.

Vehicle systems may experience various concerns, issues, or faults during their operation. Such system faults may be difficult to diagnose, and may cause vehicle componentry to be replaced without resolution of the underlying cause. Frequently, system faults may be traced to component level failures or defects. However, unresolved vehicle system faults tend to increase warranty costs and may also negatively impact customer satisfaction.

Component failures may be uncovered during component or system validation testing, or in the field, after the vehicle is put into general use. Typically, component failures are analyzed to identify the root cause and the appropriate remedial action. It may be desirable to determine whether a particular component failure has been previously encountered, the root cause of the failure has been determined, and a remedial action has been identified. Images of components and respective component failures may aid in such analysis.

SUMMARY

A method of identifying and retrieving component digital images for component fault analysis includes generating a known-fault database of digital images of known faults of a prior, previously analyzed, component and corresponding remedial actions. The method also includes accessing the known-fault database with a digital image of a current fault of a new component. The method additionally includes comparing the digital image of the current fault with the digital images in the known-fault database based on a computed target characteristic. The method also includes sorting the digital images in the known-fault database in order based on a magnitude of the computed target characteristic for each respective digital image in the known-fault database relative to the digital image of the current fault. The method further includes outputting the sorted digital images to facilitate correlation of the current fault to a particular known fault and identifying the corresponding remedial action.

The method may be specifically used for analysis of faults of vehicle powertrain components, such as components of engines and transmissions, and determination of appropriate remedial actions.

The act of generating the known-fault database may include capturing digital images depicting corresponding known faults of the prior component. Generating the known-fault database may also include selecting a portion of each digital image focused on the corresponding known fault. Generating the known-fault database may additionally include converting the selected portion of each digital image focused on the corresponding known fault into a respective known-fault mathematical model and storing the resultant known-fault mathematical models in an electronically accessible file.

According to the method, converting the selected portion of each digital image into the known-fault mathematical model may include converting the selected portion of each digital image into known-fault vectors via a trained deep learning Neural Network.

Converting the selected portion of each digital image into known-fault vectors may additionally include selecting an output layer of the trained deep learning Neural Network corresponding to the selected portion of each digital image.

The act of accessing the known-fault database with the digital image of the current fault may include accessing the known-fault database with a portion of the image of the new component focused on the current fault.

The act of accessing the known-fault database with the digital image of the current fault may also include feeding the portion of the image of the new component focused on the current fault into the trained deep learning Neural Network and converting the portion of the image of the new component focused on the current fault into a current-fault mathematical model.

The act of converting the portion of the image of the new component focused on the current fault into the current-fault mathematical model may include converting the digital image of the current fault into respective current-fault vectors via the trained deep learning Neural Network.

The computed target characteristic may be a cosine distance between a respective current-fault vector and a corresponding known-fault vector. In such an embodiment, one cosine distance is determined for each respective current-fault vector and a corresponding known-fault vector.

The act of sorting the digital images in the known-fault database may include ranking from the smallest to the largest the cosine distances between the current-fault vectors and the corresponding known-fault vectors for each known-fault mathematical model.

The act of outputting the digital images may include identifying digital images in the known-fault database corresponding to the respective sorted known-fault mathematical models. The act of outputting the sorted digital images may further include outputting a file of the digital images from the known-fault database ranked in order from an image most similar to the digital image of the new component to an image least similar to the digital image of the new component.

Also disclosed is a computer-readable medium storing an executable algorithm configured to, upon execution by a processor, perform the above identification and retrieval of previously analyzed component digital images for analysis of a new component fault.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
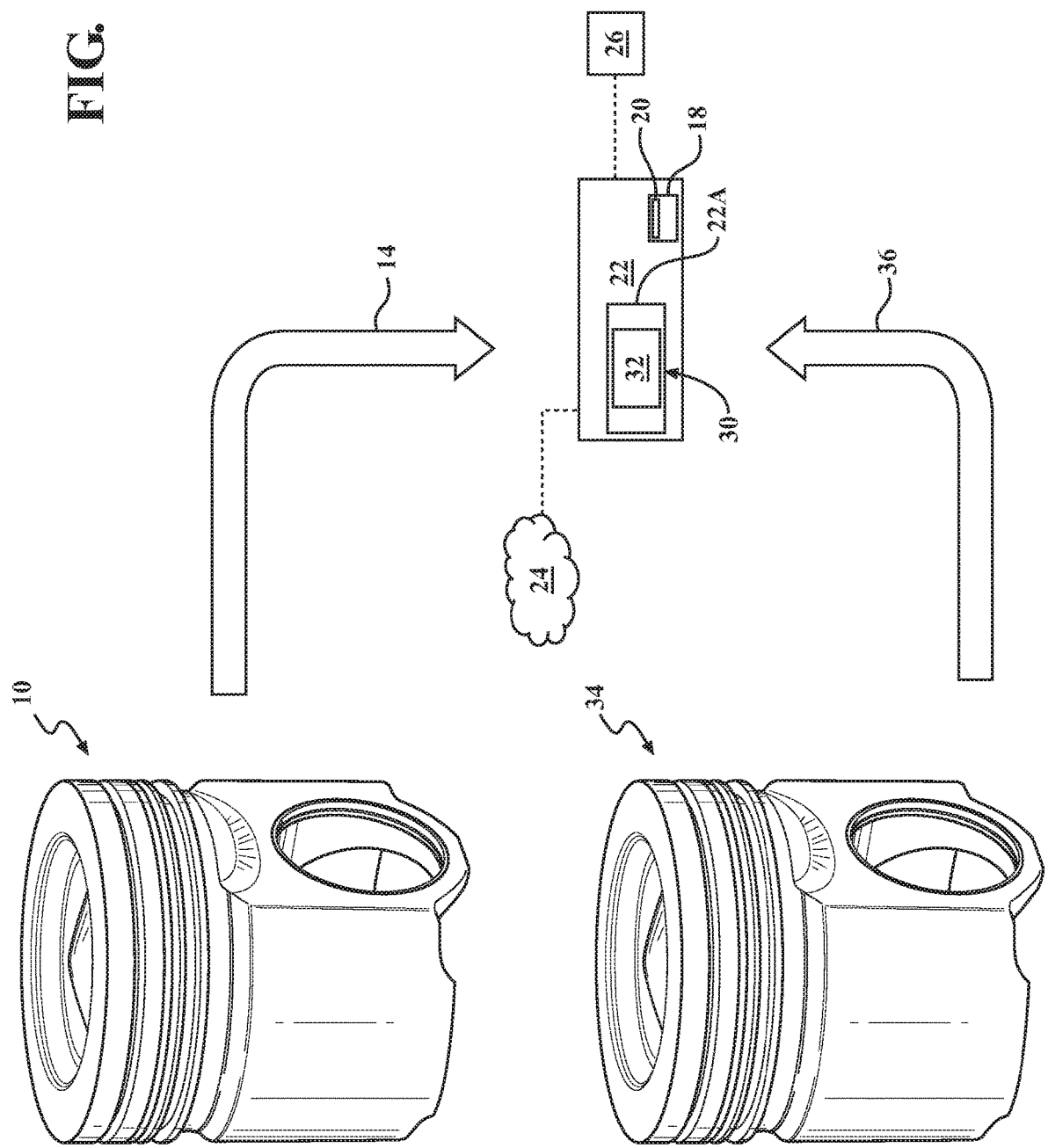
FIG. 1 is a schematic view of identification and retrieval of component digital images for component fault analysis via a computer algorithm to facilitate correlation of a current fault to a known fault and identification of a corresponding remedial action, according to the present disclosure.
Figure 2:
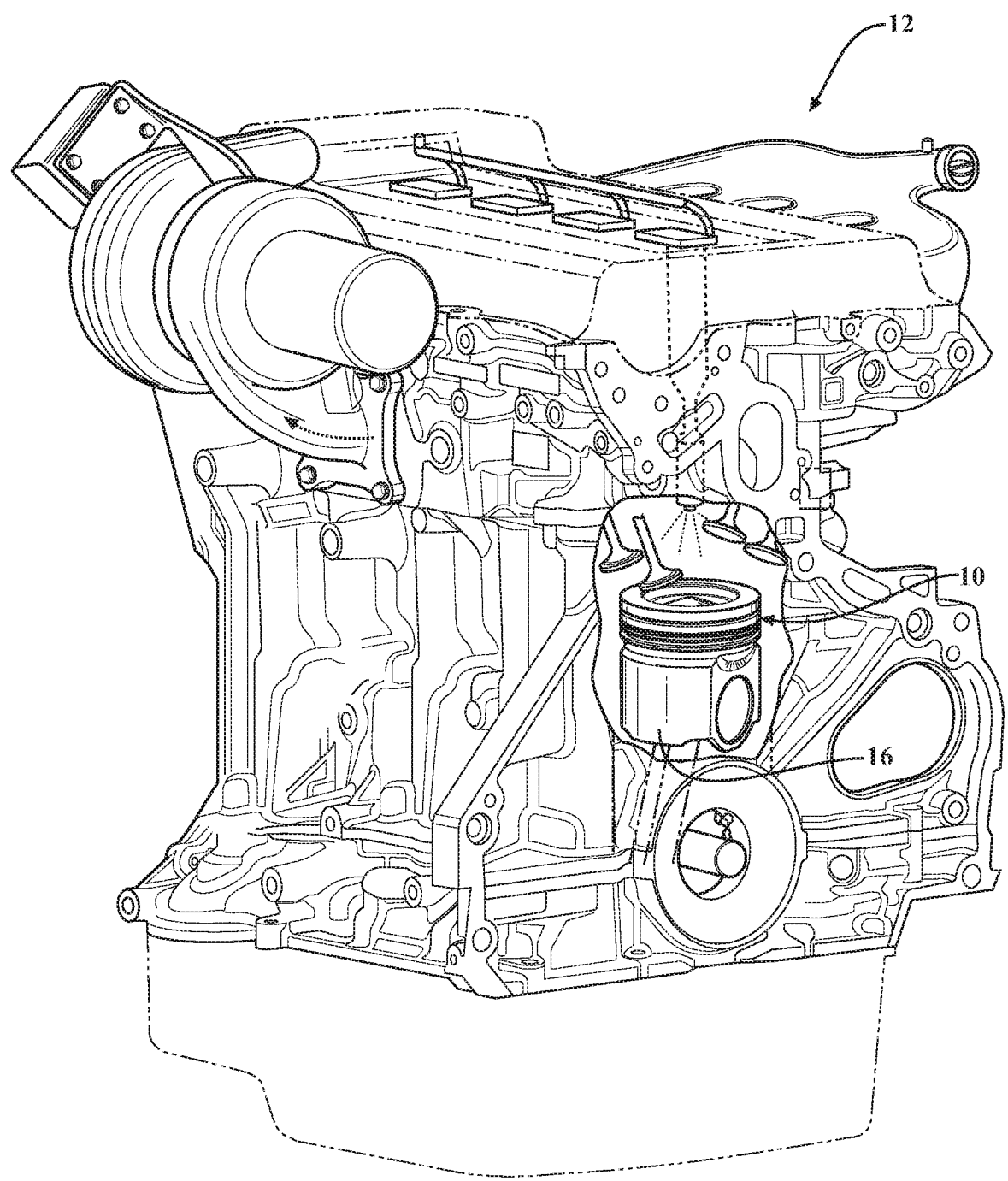
FIG. 2 is a schematic perspective close-up partial view of an internal combustion engine showing a piston embodiment of a component subject to fault analysis, according to the present disclosure.

Referring to the drawings, wherein like reference numbers refer to like components, FIG. 1 shows a schematic view of a component 10 used as a representative subject in an identification and retrieval methodology to be described in detail below. As shown, the component 10 may be part of a system in a motor vehicle (not shown), such as a vehicle powertrain. While, in an exemplary embodiment (shown in FIG. 2), the component 10 is depicted as a piston of an internal combustion engine 12, the subject component may be a different part used elsewhere in a motor vehicle or in a non-vehicle system. For purposes of conciseness, the present disclosure, specifically in the drawings, will primarily focus on the engine piston embodiment of the component 10.

Figure 4:
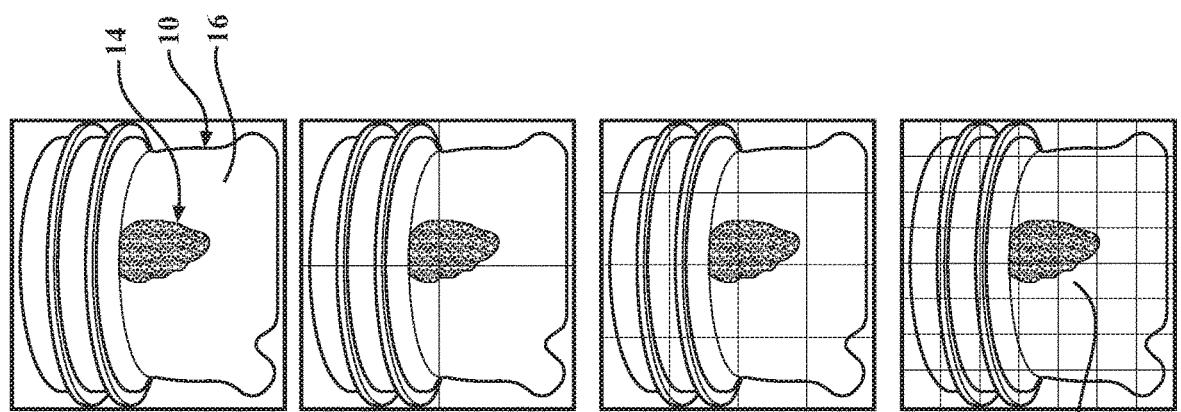
FIG. 4 is a graphical representation of an embodiment of methodology executed by the algorithm to partition the component fault image into sections in respective sliding windows, according to the present disclosure.

Generally, testing and development of the internal combustion engine 12 may uncover various faults, i.e., undesirable or incompatible material, structural, or functional characteristics, of various engine components, including the component 10 and other components at an interface therewith. Such faults may result from particular characteristics or improper function of the component 10, the engine 12, or other engine subsystems, and may lead to unsatisfactory performance of the subject component and/or the engine. Test results and records of thus learned, i.e., known, component faults 14 may be referenced during further development of the subject components, the engine 12, and the vehicle powertrain in general. FIG. 4 specifically illustrates the component fault 14 as a scuffing on a piston skirt 16.

As shown in FIG. 1, a known-fault database 18 may be generated for storing such learned or known component faults 14. The known-fault database 18 may be configured to store digital images 20 of prior or previously analyzed components, such as the component 10, their known faults 14, as well as uncovered root causes of the issues, and corresponding remedial actions. The known-fault database 18 may be generated on and supported by a programmable central computer 22 or an information technology (IT) cloud platform 24. Generally, an IT cloud platform is a provider-managed suite of hardware and software. An IT paradigm enables universal access to shared pools of configurable system resources and higher-level services that may be rapidly provisioned with minimal management effort, often over the Internet. Furthermore, cloud computing relies on sharing of resources to achieve coherence and economies of scale, similar to a public utility. The IT cloud platform 24 may also be employed in communication with the central computer 22 for coordinating and managing operation of the known-fault database 18.

The central computer 22 includes a memory that is tangible and non-transitory. The memory may be a recordable medium that participates in providing computer-readable data or process instructions. Such a medium may take many forms, including but not limited to non-volatile media and volatile media. Non-volatile media used by the central computer 22 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to an electronic processor 22A of the central computer 22. Memory of the central computer 22 may also include a flexible disk, hard disk, magnetic tape, other magnetic medium, a CD-ROM, DVD, other optical medium, etc. The central computer 22 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the central computer 22 or accessible thereby may be stored in the memory and automatically executed to provide the required functionality.

The known-fault database 18 may be accessible via a single personal computer (PC) 26 or via a plurality of similar linked computers, as shown in FIG. 1. Either the central computer 22 or the IT cloud platform 24 is configured to employ or access a discrete computer-readable medium (CRM) 30 storing an executable algorithm 32. Accordingly, the algorithm 32 may be programmed into the electronic processor 22A of the central computer 22 or embedded into the discrete accessible computer-readable medium 30. The executable algorithm 32 includes generating the known-fault database 18 from test data indicative of known faults 14 and storing the known-fault database in the computer-readable medium 30.

Figure 3:
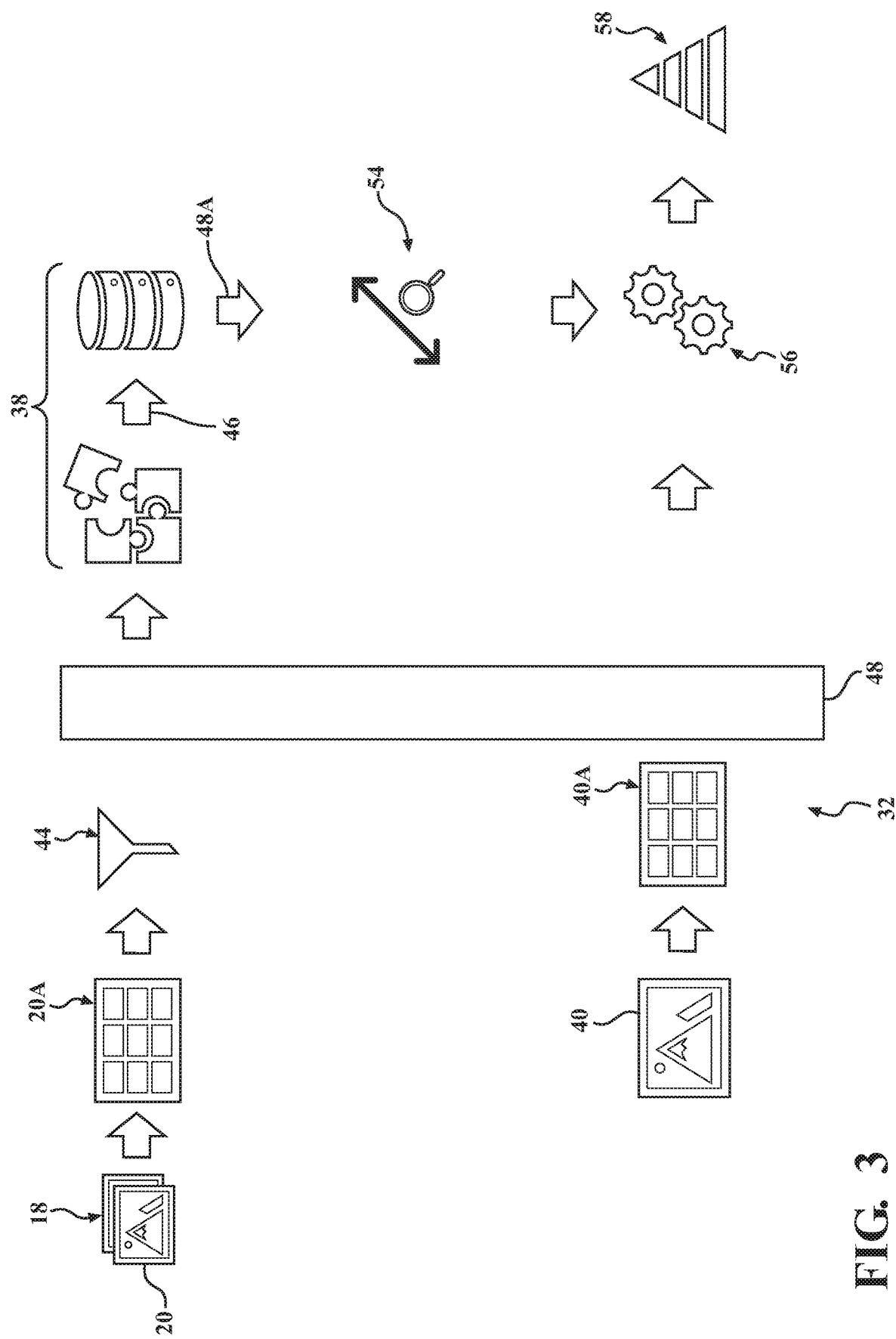
FIG. 3 is a graphical representation of an embodiment of methodology executed by the algorithm to generate a known-fault database including digital images of faults of a previously analyzed component shown in FIGS. 1 and 2, access the database with an image of a new component fault, compare the image of the new component fault with the images in the database, sort the database fault images based on a similarity of database images to the new component fault image, and output the sorted digital images, according to the present disclosure.

The algorithm 32 is also configured, upon execution by a processor, such as the electronic processor 22A, to perform an analysis of the known-fault database 18 in comparison to a new component 34, such as an engine piston similar to component 10, exhibiting a more recently uncovered, new or current fault 36, as will be described in detail below. Generating the known-fault database 18 may include capturing digital images 20 of the previously analyzed components, including the component 10, depicting corresponding known faults 14. Generating the known-fault database 18 may also include selecting a portion 20A of each digital image 20 focused on the corresponding known fault 14. The portion 20A may be isolated via partitioning the image 20 into sections in respective sliding windows, each defined by an individual partition scale configured to achieve requisite resolution of the corresponding known fault 14, as generally shown in FIG. 3. Furthermore, generating the known-fault database 18 may include converting the selected portion 20A of each digital image 20 focused on the corresponding known fault 14 into a respective known-fault mathematical model 38, and storing the resultant mathematical models in an accessible electronic file via the computer 22 or the IT cloud platform 24.

The executable algorithm 32 includes accessing the known-fault database 18 with a digital image 40 depicting the current fault 36 of the new component 34. Accessing the known-fault database 18 with the digital image 40 of the current fault 36 may include accessing the known-fault database 18 with a portion 40A of the image 40 of the new component 34 focused on the current fault 36. Similar to known-fault images 20, the portion 40A may be isolated by partitioning the image 40 into sections in respective sliding windows, each defined by an individual partition scale for achieving requisite resolution of the current fault 36 (generally shown in FIG. 3). The executable algorithm 32 is also configured to perform an analysis of the known fault 14 data in light of the current fault 36. Specifically, the executable algorithm 32 also includes comparing the digital image of the current fault 36 with the digital images 20 in the known-fault database 18 based on a computed target characteristic 42, which will be discussed below. The executable algorithm 32 additionally includes selecting the digital images 20 from the known-fault database 18. The executable algorithm 32 further includes sorting the digital images 20 in the known-fault database 18 in order based on a computed magnitude of the target characteristic 42 for each respective known-fault digital image 20 relative to the digital image 40 of the current fault 36.

The executable algorithm 32 also includes outputting the sorted digital known-fault images 20 to facilitate correlation or matching of the current fault 36 to a particular known fault 14 and identifying the corresponding remedial action. The executable algorithm 32 may include detecting known-fault key points 44 on the selected portion 20A of each digital image 20 focused on the corresponding known fault 14, and then representing the selected portion 20A of each digital image via the detected known-fault key points 44 (shown in FIG. 4). Key points 44 may, for example, be corners of the selected portion 20A of the digital image 20, thus identifying the contours of the subject portion of interest. The "ORB" filtering technique may be used by the executable algorithm 32 to detect key points 44 and identify their position in digital images, such as generally employed for object detection and tracking in computer vision. The executable algorithm 32 may use a specific number of key points 44 as indication of meaningfulness of a sliding focal window in the selected portion 20A. For example, the executable algorithm 32 may use a minimum threshold number of five key points 44 for detection in each sliding window of the selected portion 20A. In such an embodiment, windows with less than five detected key points 44 will be filtered out.

Figure 5:
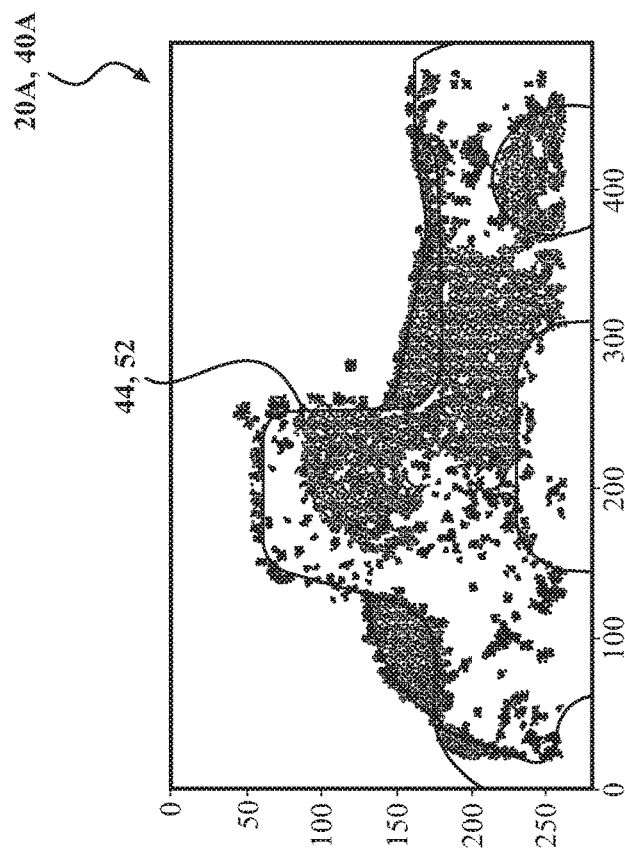
FIG. 5 is a graphical representation of an embodiment of methodology executed by the algorithm to detect fault image key points, according to the present disclosure.
Figure 6:
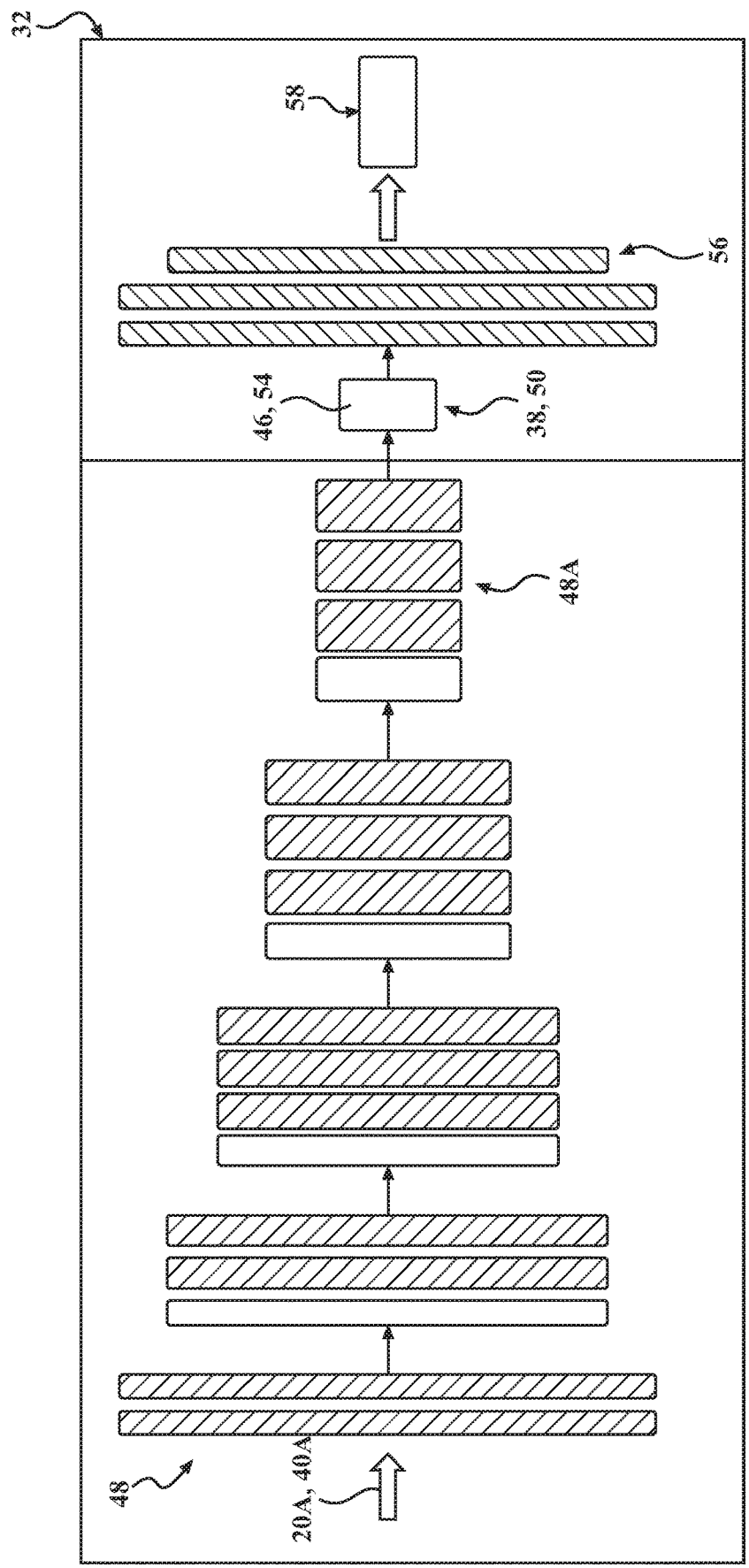
FIG. 6 is a graphical representation of an embodiment of methodology executed by the algorithm using a trained deep learning, convolutional Neural Network for recognition of the fault images, according to the present disclosure.

The executable algorithm 32 also includes using a trained deep learning, convolutional Neural Network 48 for recognition of the known-fault digital images 20. In such an embodiment, converting the selected portion 20A of each digital image 20 into the known-fault mathematical model 38 may be accomplished via converting the selected portion 20A of each digital image 20 into known-fault vectors 46 via a trained deep learning, convolutional Neural Network 48 (shown generally in FIG. 5). The trained deep learning Neural Network 48 may be programmed into either the central computer 22 or the IT cloud platform 24. Specifically, converting the selected portion 20A of each digital image 20 into the known-fault vectors 46 may include selecting an output layer 48A of the trained deep learning Neural Network 48 corresponding to the selected portion of the respective digital image.

Accessing the known-fault database 18 with the digital image 40 of the current fault 36 may include feeding the portion 40A focused on the current fault 36 of the new component 34 into the trained deep learning Neural Network 48. Recognition of the known-fault images 20 in the known-fault database 18 by the Neural Network 48 may include selecting the partition scale for the portion 20A of the known-fault image 20 to correspond to the partition scale selected for the portion 40A of the current-fault digital image 40. Furthermore, accessing the known-fault database 18 with the digital image 40 may include converting the portion 40A into a current-fault mathematical model 50. Converting the digital image 40 of the current fault 36 into the current-fault mathematical model 50 may include converting the digital image 40 into respective current-fault vectors 54 via the Neural Network 48. Similar to key points 44, the key points 52 may be corners of the selected portion 40A of the digital image 40, thus identifying the contours of the subject portion of interest (as shown in FIG. 4). The "ORB" filtering technique noted above may also be used as part of the executable algorithm 32 to detect the key points 52. The computed target characteristic 42 may specifically be a cosine distance 56 (shown in FIG. 5) between a respective current-fault vector 54 of the current-fault mathematical model 50 and a corresponding known-fault vector 46 of a particular known-fault mathematical model 38. In general, the cosine distance is a metric represented by a calculation of the cosine of the angle between non-zero vectors in either two- or three-dimensional space. The executable algorithm 32 may determine one cosine distance for each pair of computed vectors—a respective current-fault vector 54 and a corresponding known-fault vector 46.

In accordance with the above, sorting the digital images 20 in the known-fault database 18 may be performed based on a similarity of the target characteristic 42 in each of the known-fault images 20 and the new component digital image 40. Specifically, sorting the known-fault digital images 20 may include ranking the cosine distance 56 between the current-fault vectors 54 and the respective known-fault vectors 46, for each known-fault mathematical model 38, from the smallest to the largest, i.e., most similar to least similar. Additionally, outputting the sorted digital images 20 via the Neural Network 48 may be a two-step process.

The first step in outputting the sorted digital images 20 may include identifying the known-fault digital images 20 corresponding to the respective sorted known-fault mathematical models 38. The second step may include outputting a file 58 (shown in FIG. 5) of the digital images 20 from the known-fault database 18, listing the subject digital images ranked in order from an image most similar to the digital image of the new component 40 to an image least similar to the new component's digital image. Thus identified and sorted known-fault digital images 20 may be communicated upon request, either via the central computer 22 or the IT cloud platform 24, to a PC 26 (shown in FIG. 3) to facilitate matching of the current fault 36 to a particular known fault 14 and identification of the corresponding remedial action.

Figure 7:
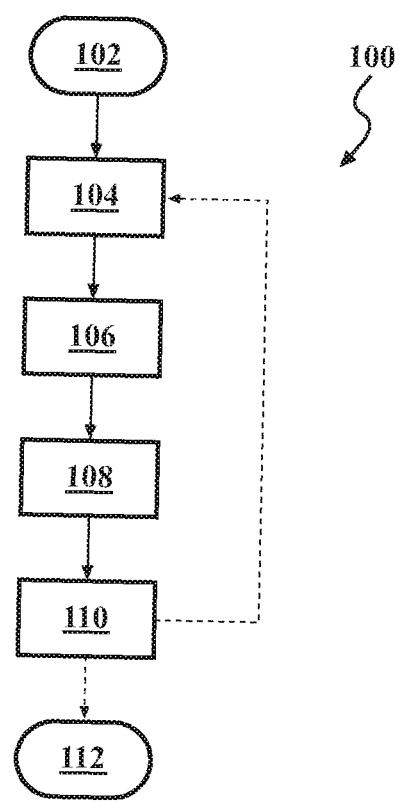
FIG. 7 is a flow diagram of a method identification and retrieval of component digital images for component fault analysis shown in FIGS. 1-6, according to the present disclosure.

FIG. 7 depicts a method 100 of identification and retrieval of component digital images 20 for component fault 14 analysis, as described above with respect to FIGS. 1-6. As described above, the method 100 is intended to be embodied in the algorithm 32 and employ machine learning to facilitate matching of the current fault 36 to a particular known fault 14 of a particular component 10, and identification of the corresponding remedial action.

The method 100 initiates in frame 102 with generating the known-fault database 18, including digital images 20 of known faults 14 of the previously analyzed component 10 and corresponding remedial actions. As described above with respect to FIGS. 1-6, generating the known-fault database 18 may include capturing the known-fault digital images 20 of such prior component(s) 10. Generating the known-fault database 18 may also include selecting a portion 20A of each digital image 20 focused on the corresponding known fault, converting the selected portion 20A of each digital image into a respective known-fault mathematical model 38, and storing the resultant mathematical models via the computer 22 or the IT cloud platform 24 in an electronically accessible file.

As additionally described above, in generating the known-fault database 18, the method may include representing the selected portion 20A of each digital image 20 via the detected known-fault key points 44. Converting the selected portion 20A of each digital image 20 into the known-fault mathematical model 38 may be accomplished via the trained deep learning Neural Network 48. Furthermore, converting the selected portion 20A of each digital image 20 into the known-fault mathematical model 38 may additionally include selecting the output layer 48A of the trained deep learning Neural Network 48 corresponding to the selected portion 20A of the respective digital image 20. Following frame 102, the method proceeds to frame 104.

In frame 104, the method includes accessing the known-fault database 18 with the digital image 40 of the current fault 36 of the newly analyzed component 34. As described above with respect to FIGS. 1-6, accessing the known-fault database 18 with the digital image 40 may include accessing the subject database with the portion 40A of the new component image 40. Accessing the database 18 with the digital image 40 may also include feeding the new component portion 40A into the Neural Network 48 and converting the subject image into the current-fault mathematical model 50. After frame 104, the method advances to frame 106.

In frame 106, the method includes comparing the current-fault digital image 40 with the digital images 20 in the known-fault database 18 based on the computed target characteristic 42. According to the method, the computed target characteristic 42 may be individual cosine distances 56 determined by comparing the current-fault mathematical models 50 with the known-fault mathematical models 38. As described above with respect to FIGS. 1-6, each cosine distance 56 is computed between a respective current-fault vector 54 of the current-fault mathematical model 50 and a corresponding known-fault vector 46 of the respective known-fault mathematical model 38. Following frame 106, the method proceeds to frame 108.

In frame 108 the method includes selecting the digital images 20 from the known-fault database 18 and sorting the subject known-fault images in order based on a specific criterion. According to the method, sorting of the known-fault images 20 may be accomplished based on the magnitude of the computed target characteristic 42 for each respective digital image 20 in the known-fault database 18 relative to the current-fault digital image 40. According to the method, sorting the digital images in the known-fault database 18 may include ranking the determined cosine distances 56 between the current-fault vectors 54 and the corresponding known-fault vectors 46, for each known-fault mathematical model 38, from the smallest to the largest. After frame 108, the method advances to frame 110.

In frame 110 the method includes outputting the sorted digital images 20 to facilitate correlation of the current fault 36 to a particular known fault 14 and identifying the corresponding remedial action. As described above with respect to FIGS. 1-6, outputting the sorted digital images may include identifying digital images 20 in the known-fault database 18 corresponding to the respective sorted known-fault mathematical models 38, and outputting the file 58 of the digital images 20 from the known-fault database 18 ranked in order from the image most similar to the image least similar to the digital image of the new component 40. Accordingly, the method may be configured to communicate the result of the identification and retrieval of component digital images 20 for component fault 14 analysis. Following frame 110, the method may return to frame 104 for accessing the known-fault database 18 with another digital image of the either the current fault 36 or an image of another newly analyzed component, or complete in frame 112.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of identifying and retrieving component digital images for component fault analysis, the method comprising:
   generating a known-fault database of digital images of known faults of a prior component and corresponding remedial actions;
   accessing the known-fault database with a digital image of a current fault of a new component;
   comparing the digital image of the current fault with the digital images in the known-fault database based on a computed target characteristic;
   sorting the digital images in the known-fault database in order based on a magnitude of the computed target characteristic for each respective digital image in the known-fault database relative to the digital image of the current fault; and
   outputting the sorted digital images to facilitate correlation of the current fault to a particular known fault and identifying the corresponding remedial action;
   wherein generating the known-fault database includes:
      capturing digital images depicting corresponding known faults of the prior component;
      selecting a portion of each digital image focused on the corresponding known fault; and
      converting the selected portion of each digital image focused on the corresponding known fault into a respective known-fault mathematical model and storing the resultant known-fault mathematical models in an electronically accessible file; and
   wherein converting the selected portion of each digital image into the known-fault mathematical model includes converting the selected portion of each digital image known-fault vectors-via a trained deep learning Neural Network.

2. The method according to claim 1, wherein converting the selected portion of each digital image into known-fault vectors additionally includes selecting an output layer of the trained deep learning Neural Network corresponding to the selected portion of the respective digital image.

3. The method according to claim 1, wherein accessing the known-fault database with the digital image of the current fault includes accessing the known-fault database with a portion of the image of the new component focused on the current fault.

4. The method according to claim 3, wherein accessing the known-fault database with the digital image of the current fault additionally includes feeding the portion of the image of the new component focused on the current fault into the trained deep learning Neural Network and converting the portion of the image of the new component focused on the current fault into a current-fault mathematical model.

5. The method according to claim 4, wherein converting the portion of the image of the new component focused on the current fault into the current-fault mathematical model includes converting the digital image of the current fault into respective current-fault vectors via the trained deep learning Neural Network.

6. The method according to claim 5, wherein the computed target characteristic is a cosine distance between a respective current-fault vector and a corresponding known-fault vector, and wherein one cosine distance is determined for each respective current-fault vector and a corresponding known-fault vector.

7. The method according to claim 6, wherein sorting the digital images in the known-fault database includes ranking from the smallest to the largest the cosine distances between the current-fault vectors and the corresponding known-fault vectors for each known-fault mathematical model.

8. The method according to claim 7, wherein outputting the sorted digital images includes:
   identifying digital images in the known-fault database corresponding to the respective sorted known-fault mathematical models; and
   outputting a file of the digital images from the known-fault database ranked in order from an image most similar to the digital image of the new component to an image least similar to the digital image of the new component.

9. A non-transitory computer-readable medium storing an executable algorithm configured, upon execution by a processor, to perform identification and retrieval of component digital images for component fault analysis, the executable algorithm comprising:
   generating a known-fault database of digital images of known faults of a prior component and corresponding remedial actions;
   accessing the known-fault database with a digital image of a current fault of a new component;
   comparing the digital image of the current fault with the digital images in the known-fault database based on a computed target characteristic;
   sorting the digital images in the known-fault database in order based on a magnitude of the computed target characteristic for each respective digital image in the known-fault database relative to the digital image of the current fault; and
   outputting the sorted digital images to facilitate correlation of the current fault to a particular known fault and identifying the corresponding remedial action;
   wherein generating the known-fault database includes:
      capturing digital images depicting corresponding known faults of the prior component;
      selecting a portion of each digital age focused on the corresponding known fault; and
      converting the selected portion of each digital image focused on the corresponding known fault into a respective known-fault mathematical model and storing the resultant known-fault mathematical models in an electronically accessible file; and
   wherein converting the selected portion of each digital image into the known-fault mathematical model includes converting the selected portion of each digital image into known-fault vectors via a trained deep learning Neural Network.

10. The computer-readable medium according to claim 9, wherein converting the selected portion of each digital image into known-fault vectors additionally includes selecting an output layer of the trained deep learning Neural Network corresponding to the selected portion of the respective digital image.

11. The computer-readable medium according to claim 9, wherein accessing the known-fault database with the digital image of the current fault includes accessing the known-fault database with a portion of the image of the new component focused on the current fault.

12. The computer-readable medium according to claim 11, wherein accessing the known-fault database with the digital image of the current fault additionally includes feeding the portion of the image of the new component focused on the current fault into the trained deep learning Neural Network and converting the portion of the image of the new component focused on the current fault into a current-fault mathematical model.

13. The computer-readable medium according to claim 12, wherein converting the portion of the image of the new component focused on the current fault into the current-fault mathematical model includes converting the digital image of the current fault into respective current-fault vectors via the trained deep learning Neural Network.

14. The computer-readable medium according to claim 13, wherein the computed target characteristic is a cosine distance between a respective current-fault vector and a corresponding known-fault vector, and wherein one cosine distance is determined for each respective current-fault vector and a corresponding known-fault vector.

15. The computer-readable medium according to claim 14, wherein sorting the digital images in the known-fault database includes ranking from the smallest to the largest the cosine distances between the current-fault vectors and the corresponding known-fault vectors for each known-fault mathematical model.

16. The computer-readable medium according to claim 15, wherein outputting the sorted digital images includes:
   identifying digital images in the known-fault database corresponding to the respective sorted known-fault mathematical models; and
outputting a file of the digital images from the known-fault database ranked in order from an image most similar to the digital image of the new component to an image least similar to the digital image of the new component.

* * * * *